US012755286B2

(12) United States Patent
Pandey et al.

(10) Patent No.: US 12,755,286 B2
(45) Date of Patent: Oct. 6, 2026

(54) # METHODS AND SYSTEMS FOR GENERATING RULES FOR UNSEEN FRAUD AND CREDIT RISKS USING ARTIFICIAL INTELLIGENCE

(71) Applicant: Mastercard International Incorporated, Purchase, NY (US)

(72) Inventors: Anubha Pandey, Bikaner (IN); Shiv Markam, Mandla (IN); Harsimran Bhasin, Delhi (IN); Deepak Bhatt, Dehradun (IN)

(73) Assignee: Mastercard International Incorporated, Purchase, NY (US)

(*) Notice: Subject to any disclaimer, the term of this patent is extended or adjusted under 35 U.S.C. 154(b) by 836 days.

(21) Appl. No.: 17/331,029

(22) Filed: May 26, 2021

(65) Prior Publication Data

US 2021/0374756 A1 Dec. 2, 2021

(30) Foreign Application Priority Data

May 29, 2020 (IN) ............................ 202041022701

(51) Int. Cl.
*G06Q 20/40* (2012.01)
*G06N 3/045* (2023.01)
(Continued)

(52) U.S. Cl.
CPC ......... *G06Q 20/4016* (2013.01); *G06N 3/045* (2023.01); *G06N 3/08* (2013.01); *G06Q 20/20* (2013.01)

(58) Field of Classification Search
CPC .... G06Q 20/4016; G06Q 20/20; G06N 3/045; G06N 3/08
(Continued)

(56) References Cited

U.S. PATENT DOCUMENTS 5,819,226 A 10/1998 Gopinathan et al.
2005/0185779 A1* 8/2005 Toms ................. H04M 3/2218 704/E17.015
(Continued)

FOREIGN PATENT DOCUMENTS

CN 109978550 3/2019
CN 109753998 5/2019

OTHER PUBLICATIONS

Information Sciences Accepted Manuscript by Ugo Fiore et al. entitled Using Generative Adversarial Networks for Improving Classification Effectiveness in Credit Card Fraud Detection, vol. 479, pp. 1-21 (Dec. 23, 2017)(excerpted).
(Continued)

*Primary Examiner* — John W Hayes
*Assistant Examiner* — Odajo Getachew
(74) *Attorney, Agent, or Firm* — Hovey Williams LLP

(57) ABSTRACT

Embodiments provide methods and systems for detecting frauds in payment transactions made by payment instrument using spend patterns of multiple payment instruments associated with user. The method performed by server system includes accessing payment transaction data associated with a plurality of customers from a transaction database. The method includes training a first generative adversarial network (GAN) model based on the payment transaction data and a plurality of probable fraud risk conditions. The first GAN model is trained to generate simulated customer fraud behaviors. The method includes filtering, by the server system, the simulated customer fraud behaviors based on a predetermined filtering criteria. The method includes generating, by the server system, fraud risk scores for the simulated customer fraud behaviors based on a fraud risk model. The method includes extracting fraud risk rules
(Continued)

based on a set of simulated customer fraud behaviors from the simulated customer fraud behaviors.

18 Claims, 13 Drawing Sheets

(51) Int. Cl.
*G06N 3/08* (2023.01)
*G06Q 20/20* (2012.01)
(58) Field of Classification Search
USPC .......................................................... 705/64
See application file for complete search history.

(56) References Cited

U.S. PATENT DOCUMENTS

| | | | | |
|---|---|---|---|---|
| 2014/0143134 | A1* | 5/2014 | Yan | G06Q 40/02 705/38 |
| 2018/0053188 | A1* | 2/2018 | Zoldi | G06Q 20/102 |
| 2019/0147343 | A1 | 5/2019 | Lev et al. | |
| 2020/0065221 | A1 | 2/2020 | Truong et al. | |
| 2020/0065812 | A1* | 2/2020 | Walters | G06N 3/047 |
| 2020/0099530 | A1* | 3/2020 | Khatib | G06F 18/24 |
| 2020/0366463 | A1* | 11/2020 | Falk | G06F 7/08 |
| 2020/0380417 | A1* | 12/2020 | Briancon | G06Q 30/012 |

OTHER PUBLICATIONS

IEEE Article by Adrian Mead et al. entitled Detecting Fraud in Adversarial Environments: A Reinforcement Learning Approach, pp. 118-122 (2018).
Article by Ruoyu Deng et al. entitled FraudJudger: Real-World Data Oriented Fraud Detection on Digital Payment Platforms (Sep. 5, 2019).
Information Sciences Accepted Manuscript by Fabrizio Carcillo et al. entitled Combining Unsupervised and Supervised Learning in Credit Card Fraud Detection, vol. 557, pp. 317-331 (May 2021).

* cited by examiner

METHODS AND SYSTEMS FOR GENERATING RULES FOR UNSEEN FRAUD AND CREDIT RISKS USING ARTIFICIAL INTELLIGENCE

CROSS REFERENCE TO RELATED APPLICATIONS

This application claims priority to Indian Provisional Application No. 202041022701, filed May 29, 2020, which is incorporated herein by reference in its entirety.

TECHNICAL FIELD

The present disclosure relates to artificial intelligence processing systems and, more particularly to, electronic methods and complex processing systems for generating fraud or credit risk detection rules for unseen fraud and credit risks using machine learning techniques.

BACKGROUND

Tracking financial fraud or default in payment transactions is a very challenging task. Fraudsters keep utilizing very sophisticated techniques in online payment account frauds, where such transactions do not appear like fraud transactions to parties involved in the transactions. In fact, fraudsters can look and behave exactly what an authentic customer might be expected to look like and behave while doing online and/or offline transactions. Further, when the fraudsters use multiple channels i.e. combining both online and offline steps, these channels may individually look like fair and acceptable transactions, but when considered in combinations, turn out to be fraudulent attacks. Hence, identifying truly suspicious events that deserve further actions by limited fraud resources remains a serious challenge for financial institutions.

In existing risk control systems, fraud and credit risk detection models used in such systems are passive in nature. Once fraud/default patterns are captured, the fraud and credit risk models are trained to react in the future. Reactive strategies are no longer effective against fraudsters or emerging default patterns. Too often, financial institutions learn about fraud. It is no longer realistic to attempt to stop fraudsters by defining new detection rules after the fraudulent act, as one can never anticipate and respond to every new fraud pattern. This prompts an immense loss in revenue and impacts customer experience negatively. The fraud detection models take into consideration, a list of locations, points of sales, amount of transaction, etc., which are marked as fraudulent in the past to detect fraudsters and defaulters in the future.

In addition, the fraud and credit risk model-based solutions are generally always behind the latest fraud/default techniques. These solutions merely react to known threats instead of recognizing new threats as they happen. As a result, these solutions are unable to spot new fraud/default types and patterns.

Thus, there is a need for a technical solution for determining unseen fraud and credit risk patterns and generating rules for unseen fraud and credit risk patterns, proactively, through the use of artificial intelligence and machine learning.

SUMMARY

Various embodiments of the present disclosure provide systems and methods to generate fraud risk detection rules for unseen fraud risks using the first GAN model.

In an embodiment, a computer-implemented method is disclosed. The computer-implemented method performed by a server system includes accessing payment transaction data associated with a plurality of customers from a transaction database. The payment transaction data includes information of past payment transactions performed by the plurality of customers within a particular time interval. The method includes training a first generative adversarial network (GAN) model based, at least in part, on the payment transaction data and a plurality of probable fraud risk conditions. The first GAN model is trained to generate simulated customer fraud behaviors. The method includes filtering the simulated customer fraud behaviors based, at least in part, on a predetermined filtering criterion. The method further includes generating fraud risk scores for the simulated customer fraud behaviors based, at least in part, on a fraud risk model. The method includes extracting fraud risk rules based, at least in part, on a set of simulated customer fraud behaviors from the simulated customer fraud behaviors. The set of simulated customer fraud behaviors may have fraud risk scores lower than a threshold value.

BRIEF DESCRIPTION OF THE FIGURES

For a more complete understanding of example embodiments of the present technology, reference is now made to the following descriptions taken in connection with the accompanying drawings in which.

Figure 1:
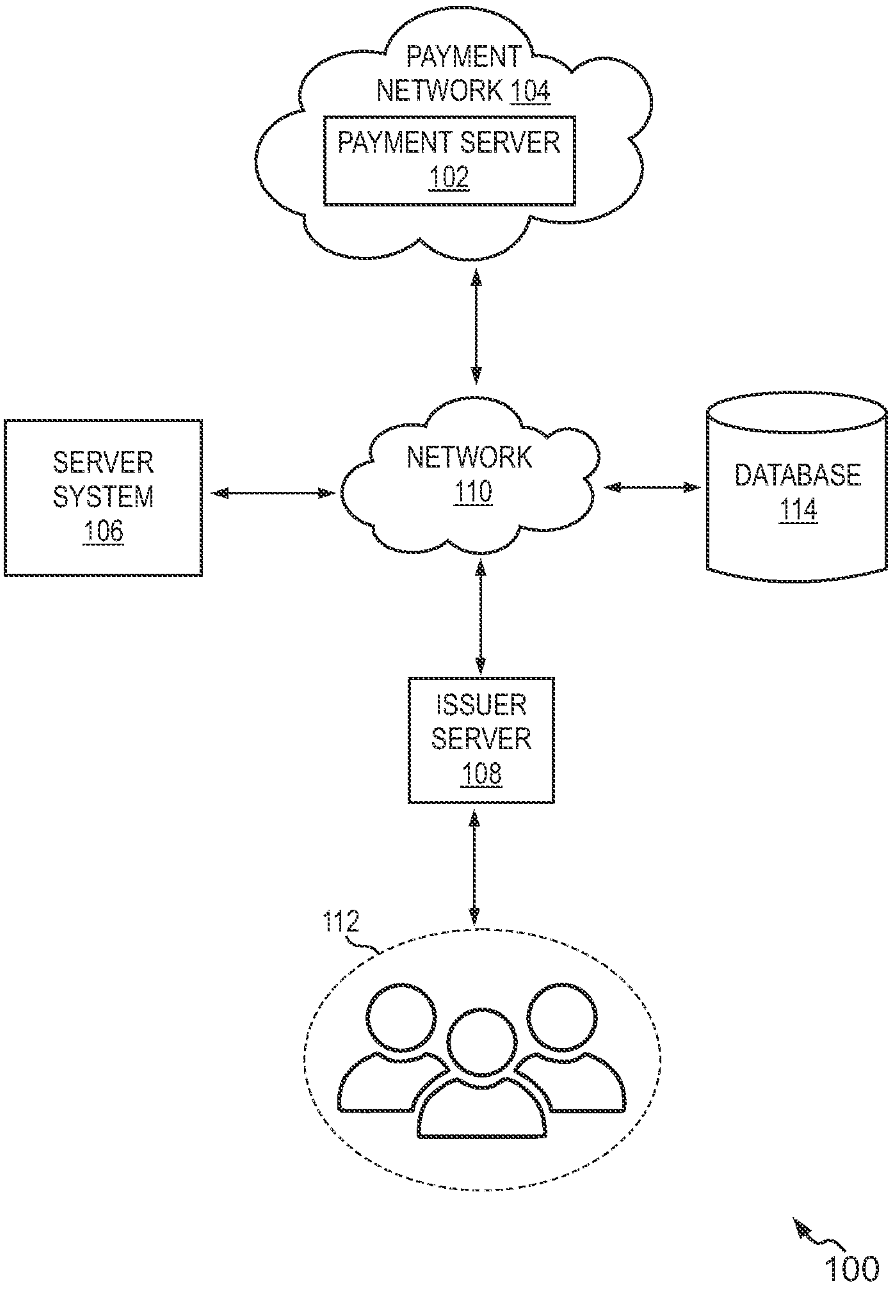
FIG. 1 is an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The term "payment network", used throughout the description, refers to a network or collection of systems used for transfer of funds through the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, etc.

The term "payment transaction" or "transactions" refers to any transaction involving directly or indirectly the movement of monetary funds through traditional paper transaction processing systems (i.e., paper check processing) or through electronic transaction processing systems. Typical financial transactions include point of sale (POS) transactions, automated teller machine (ATM) transactions, internet transactions, electronic funds transfers (EFT) between accounts, transactions with a financial institution teller, personal cheques, etc.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods, systems, user devices and computer program products for generating fraud or credit risk detection rules for unseen fraud and credit risks using machine learning techniques.

In existing systems, passive approaches are used to detect frauds and credit card abuse. Fraud and credit abuse patterns are emerging every day. Passive approaches are the ones where the fraud and credit abuse patterns are taken once they have occurred and then models are trained to react in future if the same fraud and credit abuse patterns are detected. This leads to huge loss in revenue and impacts customer experience negatively.

Since new fraud and credit abuse patterns are emerging rapidly, these models tend to be outdated and miss out on detecting fraud and credit abuse patterns that are unseen by the model previously. The present disclosure adapts AI approach to utilize behavior of usage of multiple cards that a customer holds to detect patterns of fraud and default. A generative modeling approach is utilized to simulate fraud/default behaviors of a customer using past payment transaction data and detect any deviations of real-time transactional patterns to capture fraud/credit risk.

In an example, the present disclosure describes a server system that detects fraud based on the multiple card usage patterns for a customer. A setting of a generator neural network model and a discriminator neural network model where generator neural network model learns to simulate the transactional level behavior of a customer (for example, spend behavior) while the discriminator neural network model learns to distinguish simulated transactional level behavior against real transaction level behavior accessed from a transaction database. The generator neural network model is trained to output transactional level behavior of a customer, given his/her transactional level behavior as input to the generator neural network model.

In this fashion, the network is trained to predict the transactional level behavior of a customer given real transactional level behavior of the customer. During execution, the discriminator neural network model is utilized to predict if the seen transactional behavior matches well against simulated transactional level behavior. Any deviations derived from discriminator neural network model are used to mark the transactional behavior as fraud. Similarly, another set of generator neural network model and discriminator neural network model may be trained using historical default data to detect default/credit risk in real-time.

In an example, the present disclosure describes a server system that generates fraud or credit risk detection rules for unseen fraud risks using GAN models. Fraud and credit risk rules may be used to detect any fraud/default in real time before the payment transaction is processed. In an example embodiment, the GAN models may include first GAN model and a second GAN model. The first GAN model may be trained to generate simulated customer fraud behaviors using payment transaction data associated with the customer that is accessed from a transactional database.

The server system includes at least a processor and a memory. In one non-limiting example, the server system may be incorporated in a payment server or an issuer server. The server system is configured to access payment transaction data associated with a plurality of customers from a transaction database. The payment transaction data may include information of past payment transactions performed by the plurality of customers within a particular time interval. The payment transaction data may include fraud and non-fraud payment transactions, default and non-default payment transactions, and the like. The payment transaction data may include information such as amount, date and time, merchant details, merchant category code (MCC), etc. The time particular time interval may be set to one week, one month, one year or the like.

The server system is configured to train a first generative adversarial network (GAN) model based on the payment transaction data and a plurality of probable fraud risk conditions. The first GAN model is trained to generate simulated customer fraud behaviors. The plurality of probable fraud risk conditions may include, but not limited to, high dollar fraudsters, online versus offline fraud transactions, point of sale (POS) versus barcode based transactions, market-specific fraud patterns, etc. Simulated customer fraud behaviors may be generated for spend behaviors in one example embodiment.

Similarly, the server system is configured to train a second generative adversarial network (GAN) model based on the payment transaction data and a plurality of probable default risk conditions. The first GAN model is trained to generate simulated customer default behaviors. The plurality of probable default risk conditions may include, but not limited to, high credit exposure defaulters, online versus offline default transactions, etc.

The server system is further configured to filter the simulated customer fraud behaviors based on a predetermined filtering criterion. The predetermined filtering criterion may include constraints set by the issuer 108. Some examples of these constraints are, but not limited to, a location, a product, time and amount of transaction, type of transaction, etc. The filtering is performed for reducing the output space and targeting a specific condition where the fraud is highly possible.

The server system is configured to generate fraud risk scores for the simulated customer fraud behaviors based on a fraud risk model. In one embodiment, the fraud risk model may be a pre-trained model for generating fraud risk score. In one example, if the fraud risk score for a simulated customer fraud behavior is high, it means that for a payment transaction being made by the customer in the future, there are high chances of it being a fraud.

The server system is further configured to extract fraud risk rules based on a set of simulated customer fraud behaviors from the simulated customer fraud behaviors. The set of simulated customer fraud behaviors is those simulated customer fraud behaviors that have fraud risk scores lower than a threshold value. The simulated customer fraud behaviors having fraud risk scores lower than a threshold value are considered because these are the fraud behaviors that are unseen by the pre-trained fraud risk model resulting in lesser fraud risk scores.

Various embodiments of the present disclosure offer multiple advantages and technical effects. For instance, the present disclosure provides fraud and credit risk detection rules for detecting unseen frauds and credit defaults, thereby preventing huge revenue loss. The present disclosure allows the system to identify unseen risk profiles that existing credit or fraud risk models may have missed and to help banks derive enhanced strategic rules from simulated customer behavior to mark an incoming transaction as a potential risk. Further, the generation of compact representation of data in the GAN model and embedding of model hyperparameters enable reduced memory utilization.

Various example embodiments of the present disclosure are described hereinafter with reference to FIGS. 1 to 10.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, determining unseen fraud and credit (default) risk, etc. The environment 100 generally includes a payment server 102 associated with a payment network 104, a server system 106, an issuer server 108, a plurality of customers 112 associated with the issuer server 108, and a database 114 each coupled to, and in communication with (and/or with access to) a network 110. The network 110 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts illustrated in FIG. 1, or any combination thereof. The terms "customer" and "user" may be interchangeable throughout the description. These terms may relate to a direct customer of an issuer or person or entity that has authorization to act on behalf of the direct customer or user (i.e., indirect customer).

Various entities in the environment 100 may connect to the network 110 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. For example, the network 110 may include multiple different networks, such as a private network made accessible by the server system 106 or the payment server 102, separately, and a public network (e.g., the Internet, etc.) through which the server system 106 and the payment server 102 may communicate.

In one embodiment, the payment network 104 may be used by the payment cards issuing authorities as a payment interchange network. Examples of payment interchange network include but are not limited to, Mastercard® payment system interchange network. The Mastercard® payment system interchange network is a proprietary communications standard promulgated by Mastercard International Incorporated® for the exchange of financial transaction data between issuers and acquirers that are members of Mastercard International Incorporated®. (Mastercard is a registered trademark of Mastercard International Incorporated located in Purchase, N.Y.).

In one embodiment, the issuer server 108 is associated with a financial institution normally called as an "issuer bank" or "issuing bank" or simply "issuer", in which the customers 112 may have at least one payment account, (which also issues payment cards, such as credit cards or debit cards), and provides banking services (e.g., payment transaction using credit/debit cards) for processing payment transactions using a card, to the plurality of customers 112. More specifically, each of the plurality of customers 112 may be any individual buyer, representative of a corporate entity, or any other person that is presenting credit or debit card during a payment transaction with a merchant representative or other seller. In one embodiment, the plurality of customers 112 can perform card present or card-not-present transactions.

In one embodiment, the server system 106 is configured to perform one or more of the operations described herein. The server system 106 may be a computing server configured to determine unseen credit and fraud risk using machine learning models. The machine learning models may be trained based on past customer transaction data associated with the plurality of customers 112 stored in the database 114. The database 114 may belong to issuer server 108 or the payment server 102. The customer transaction data may be segregated into non-fraud transaction data, fraud transaction data, default transaction data, non-defaulter transaction data, etc. The machine learning models associated with the server system 106 may include generative models that are trained to generate simulated observations based on the previously recorded observations i.e., the previous transaction data.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

The present disclosure also provides a detailed study of different techniques that can be used with GANs to generate more discriminative fraud samples and to handle the training issues related to GANs along with their applicability and limitations in the real world scenario. Extensive experiments have been conducted on the publicly available credit card dataset and it shows an absolute improvement of 6% in Recall and 3% in F1-score in the performance of XGBoost classifier when trained on an augmented dataset compared to the original dataset.

Figure 2:
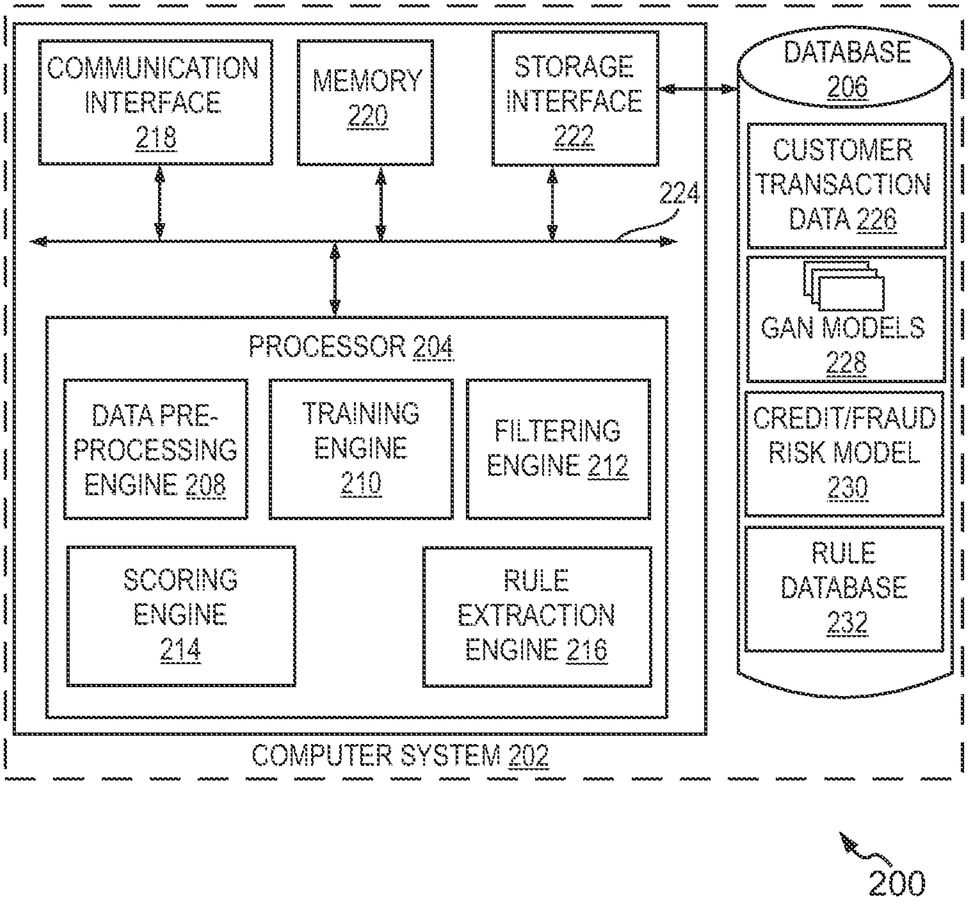
FIG. 2 is a simplified block diagram of a server system, in accordance with one embodiment of the present disclosure.

Referring now to FIG. 2, a simplified block diagram of a server system 200, is shown, in accordance with an embodiment of the present disclosure. The server system 200 is an example of the server system 106. In some embodiments, the server system 200 is embodied as a cloud-based and/or SaaS-based (software as a service) architecture. The server system 200 includes a computer system 202 and a database 206. The computer system 202 includes at least one processor 204 for executing instructions, a memory 220, a communication interface 218, and a storage interface 222 that communicate with each other via a bus 224.

In some embodiments, the database 206 is integrated within the computer system 202. For example, the computer system 202 may include one or more hard disk drives as the database 206. The storage interface 222 is any component capable of providing the processor 204 with access to the database 206. The storage interface 222 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 204 with access to the database 206.

In one embodiment, the database 206 is configured to store customer transaction data 226 received from the issuer 108, GAN models 228, credit/fraud risk model 230, and rule database 232.

The processor 204 includes suitable logic, circuitry, and/or interfaces to execute operations for accessing various transaction data and utilize trained machine learning models. Examples of the processor 204 include, but are not limited to, an application-specific integrated circuit (ASIC) processor, a reduced instruction set computing (RISC) processor, a complex instruction set computing (CISC) processor, a field-programmable gate array (FPGA), and the like. The memory 220 includes suitable logic, circuitry, and/or interfaces to store a set of computer-readable instructions for performing operations. Examples of the memory 220 include a random-access memory (RAM), a read-only memory (ROM), a removable storage drive, a hard disk drive (HDD), and the like. It will be apparent to a person skilled in the art that the scope of the disclosure is not limited to realizing the memory 220 in the server system 200 as described herein. In another embodiment, the memory 220 may be realized in the form of a database server or cloud storage working in conjunction with the server system 200, without departing from the scope of the present disclosure.

The processor 204 is operatively coupled to the communication interface 218 such that the processor 204 is capable of communicating with a remote device (not shown in the figure) such as the issuer server 108, or communicated with any entity connected to the network 110 (as shown in FIG. 1).

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one embodiment, the processor 204 includes a data pre-processing engine 208, a training engine 210, a filtering engine 212, a scoring engine 214, and a rule extraction engine 216. It should be noted that the components, described herein, can be configured in a variety of ways, including electronic circuitries, digital arithmetic and logic blocks, and memory systems in combination with software, firmware, and embedded technologies.

The data pre-processing engine 208 includes suitable logic and/or interfaces for accessing payment transaction data of a plurality of customers associated with at least one issuer (e.g., “issuer server 108”) from the database 206 and performing featurization process over the payment transaction data for determining a plurality of customer feature vectors. The payment transaction data may be associated with the past payment transactions performed by the plurality of customers 112 for a particular time window (e.g., 1 year). The data pre-processing engine 208 is configured to determine the plurality of customer feature vectors based at least on the customer spending behaviors, payment behavior, and customer credit bureau information (for example, credit score).

The customer spending behaviors may include spending related variables such as, but not limited to, merchant-specific spending (e.g., airlines, hotel, entertainment, etc.), transaction velocity, spending in a month, etc. In one example, “customer spending behaviors” refer to historical patterns in the customer’s transactions over a period of time. For instance, the “transaction velocity” is a part of customer spending behavior and refers to the number of transactions or cumulative amount of transactions associated with a payment account or related accounts that occur within a specified time period (e.g., twenty transactions of $100 within a day, three transactions of $500 or more within an hour). The payment behavior may include, but not limited to, payment-related behavior such as, for example, minimum credit due paid indicator, average remittance, payment bills, loan repayment, etc.

Thus, the data pre-processing engine 208 is configured to generate a plurality of multivariate customer feature vectors based at least on the customer spending behaviors, the payment behavior, and the customer credit bureau information. In one example, a set of customer feature vectors may be associated with customers who were engaged in fraudulent financial activities in the past time. In another example, a set of customer feature vectors may be associated with customers who are genuine or non-fraud at present.

In one embodiment, the data pre-processing engine 208 is configured to obtain customer feature vectors sampled from a known customer sample set such as, non-default, non-fraud, etc. The customer feature vectors are taken as input for training components of the generative adversarial network (GAN) models 228.

In one embodiment, the GAN models 228 may include two or more GAN models that are trained to generate simulated customer behaviors for a particular condition. For example, a first GAN model (not shown in the figure) may be trained for generating simulated customer fraud behaviors. Additionally, a second GAN model (not shown in the figure) may be trained for generating simulated customer default behaviors.

The training engine 210 includes a suitable logic and/or interfaces for training machine learning models (such as generative adversarial network (GAN) models) to learn underlying patterns corresponding to credit risk (default versus non-default) and fraud risk (fraud versus non-fraud). The GAN models are trained for simulating risky behaviors of customers which may be potentially unseen for fraud and credit risk detection.

In one embodiment, the training engine 210 may train the first GAN model and the second GAN model for generating simulated customer fraud behaviors and simulated customer default behaviors respectively. The GAN models 228 are trained for determining simulated or virtual customer behaviors on fraud/non-fraud for fraud risk and default/non-default for credit risk.

In order to generate simulated customer behaviors for capturing different kinds of frauds, the training engine 210 is configured to train the first GAN model of the GAN models 228 for a plurality of probable fraud risk conditions using a conditional flag vector as input to the first GAN model. Each bit value of the conditional flag vector represents a combination of the probable fraud risk conditions. The plurality of probable fraud risk conditions may include, but not limited to, high credit exposure fraudsters/defaulters, online versus offline fraud transactions, POS-based transactions, barcode-based transactions, market-specific fraud patterns, etc. During the training of the first GAN model, the conditional flag vector is provided randomly to learn the distribution of risky behaviors against one of the plurality of probable fraud risk conditions. Rather than training different GAN models for each probable fraud risk conditions, a single GAN model is trained for the plurality of probable fraud risk conditions iteratively, thereby helping in reducing the time required for the training process.

Similarly, in one embodiment, in order to generate simulated customer behaviors for capturing default risks, the training engine 210 is configured to train the second GAN model of the GAN models 228 for a plurality of probable default risk conditions using a conditional flag vector as input to the second GAN model.

In one embodiment, both first GAN model includes a generator neural network model and a discriminator neural network model. The generator and discriminator neural network models can be mutually trained. In one embodiment, the training engine 210 is configured to provide the random input vectors associated with customers to the generator neural network model as an input. In another embodiment, the training engine 210 is configured to provide the random input vector and the conditional flag vector as an input. The generator neural network model attempts to generate simulated fraud samples that are representations of fraud behavior based at least on the random input vector and the conditional flag vector. In one example, the generator neural network model is configured to generate univariate customer feature vectors representing simulated customer fraud behaviors.

The discriminator neural network is configured to receive customer feature vectors associated with real customer fraud behaviors along with the simulated customer fraud behaviors and discriminate between real customer fraud behaviors and simulated customer fraud behaviors. In one embodiment, for the simulated customer fraud behaviors determined as fake by the discriminator neural network model, the generator neural network model is penalized and its neural network weights are adjusted accordingly. The training engine 210 may penalize the generator neural network model and the discriminator neural network model for adjusting their neural network weights until the generator neural network model can generate simulated customer fraud behaviors that are similar to the real customer fraud behaviors and the discriminator neural network model is not able to detect any deviation between the simulated customer fraud behaviors and the real customer fraud behaviors.

Similarly, the second GAN model may also include a generator neural network model and a discriminator neural network model. In one embodiment, the training engine 210 is configured to provide the random input vectors associated with customers to the generator neural network model as an input. In another embodiment, the training engine 210 is configured to provide the random input vector and the conditional flag vector as an input. The generator neural network model attempts to generate simulated default samples that are representations of default behavior based at least on the random input vector and the conditional flag vector. In one example, the generator neural network model is configured to generate multivariate payment transaction sequences associated with the simulated customer default behaviors.

The discriminator neural network is configured to receive customer feature vectors associated with real customer default behaviors along with the simulated customer default behaviors and discriminate between real customer default behaviors and simulated customer default behaviors. In one embodiment, for the simulated customer default behaviors determined as fake by the discriminator neural network model, the generator neural network model is penalized and its neural network weights are adjusted accordingly. The training engine 210 may penalize the generator neural network model and the discriminator neural network model for adjusting their neural network weights until the generator neural network model can generate simulated customer default behaviors that are similar to the real customer default behaviors and the discriminator neural network model is not able to detect any deviation between the simulated customer default behaviors and the real customer default behaviors.

Sometimes, fraudsters or hackers may use non-fraudulent customer behavior data to find loopholes and perform fraudulent activities. Therefore, to eliminate the above technical problem, in one embodiment, the training engine 210 may also utilize real customer non-fraud behavior data to train the generator neural network model to generate simulated customer fraud behaviors from the real customer non-fraud behavior data. In order to increase the number of simulated customer fraud behaviors generated using real customer non-fraud behavior data, an input space of the generator neural network model is perturbed by increasing input n-dimensional representation through the addition of latent vector or random noise vector. Thereafter, the generator neural network model and the discriminator neural network model are trained competitively in a similar manner as discussed above.

In one embodiment, the generator and discriminator neural network models may be, but not limited to, multi-layer neural networks, convolutional neural networks (CNN), recurrent neural networks, etc. In one example, the multi-layer neural networks are utilized in the GAN model when each customer feature vector is represented in the form of one-dimensional vector. In another example, the convolutional neural networks are utilized in the GAN model when the customer feature vectors are represented as a matrix of size m*n, where 'm' is the number of customer transactions from random customer transactions over the particular time window and 'n' is the number of features representing customer.

In one embodiment, in order to train the second GAN model for learning transformation of a customer from non-defaulter state to defaulter state, the training engine 210 implements a recurrent neural network (RNN)-based GAN model. The second GAN model learns time-dependent features of transaction data of customers from the non-defaulter stage to a defaulter stage. The training engine 210 is configured to receive customer transaction data in a time sequence manner which is provided as an input to the second GAN model. After training, the generator neural network model may be able to find out how a non-defaulter user would look like in the next X number of months/weeks by generating virtual customers for that time in the future (i.e., X number of days or months).

It may be a cumbersome task to assess the default risk of low tenure customers, therefore, to overcome the above limitation, the training engine 210 utilizes a set of customer feature vectors associated with specified time duration for the low tenure customers (i.e., capturing historical transaction patterns of the low tenure customers) for training the second GAN model. Once the second GAN model is trained, the generator neural network model of the second GAN model is configured to simulate default customers from one reference time point to another based on the learned temporal dependency of customer features vectors of the plurality of customers.

In a similar manner, the training engine 210 may also train the second GAN model to simulate customer behaviors with high dollar exposure value using customer transaction data of one or more customers when they were low dollar exposure customers till a point of time where they turned out to be high dollar exposure customers. In other words, the second GAN model is configured to learn the transition of customers from low dollar exposure to high dollar exposure. In an example, a band of dollar exposures may be defined such as 0$ to 100$ as band A, 10001$ to 2500$ as band B, 2501$ to 4000$ as band C and so on. These different bands may be included as flags during the training process that could be fed to the generator neural network model to cater to generate simulated customers for various bands of dollar exposure ranging from 0 to any other extreme amount of dollar exposure. Thus, in real-time implementation, the second GAN model can simulate virtual customer behaviors of high credit and fraud risks.

Once the GAN models 228 are trained, the GAN models 228 may be fed with a random input vector and a conditional flag vector to generate simulated virtual customer behaviors associated with the probable fraud/credit risk conditions (such as, high dollar exposure frauds/defaults, high credit risk, etc.). Based on the random input vector and the conditional flag vector, the processor 204 is configured to output a plurality of simulated customer behaviors that may have fraudulent behavior, high dollar exposure, or high credit risk based on the conditional flag vector using the trained GAN models.

The filtering engine 212 includes a suitable logic and/or interfaces for filtering the simulated customer fraud/default behaviors based at least on predetermined filtering criterion set by the issuer 108. The predetermined filtering criterion may include constraints such as, but not limited to, a location, a product, time and amount of transaction, type of transaction, etc. In one example, the issuer 108 wants to detect customers with high dollar exposure values. In this scenario, the filtering engine 212 is configured to filter out simulated customer behaviors on the basis of their simulated exposure value.

The scoring engine 214 includes a suitable logic and/or interfaces for generating confidence risk scores for the filtered simulated customer fraud/default behaviors using credit and fraud risk models. In one embodiment, the credit and fraud risk models 230 may be pre-trained models and generate confidence risk score such as fraud risk score and/or default risk scores. In one example, if the fraud risk score for a simulated customer fraud behavior is high, it means that for a payment transaction being made by the customer in the future, there are high chances of it being a fraud.

The processor 204 is configured to retain a set of simulated customer fraud/default behaviors from the simulated customer fraud/default behaviors with fraud/default risk score lower than a threshold value. The set of simulated customer fraud/default behaviors is provided to the rule extraction engine 216. This process filters out the simulated customer fraud/default behaviors that the scoring engine 214 will fail to capture as the fraud/default risk scores would be low for their chances of being a fraud or default.

The rule extraction engine 216 includes a suitable logic and/or interfaces for extracting fraud and credit risk rules which may be used to flag fraud/default customers in real-time using the set of simulated customer behaviors that are retained. In one embodiment, the fraud/credit risk rules may be extracted manually or automatically by learning a tree classifier resulting in rules to be extracted to classify an incoming real-time transaction as fraudulent or credit risky. The rule extraction engine 216 may be coupled with other models to extract fraud/credit risk rules indicating a future transaction or a customer to be marked as risky. The extracted fraud/credit risk rules may be further stored in rule database 232 which can be used in real-time flagging of fraud/credit risk in the future. In one embodiment, the rule extraction engine 216 is configured to utilize simulated customer behaviors which correspond to fraud/default risk scores lower than a threshold value for rule extraction.

In one embodiment, to reduce false positives in rule-extraction process, a set of non-fraud transactions is matched with the simulated customer behaviors. The lower the fraud/default risk scores, the more confident the processor 204 is in associating the simulated customer behavior to be riskier. Accordingly, any simulated customer behavior demonstrating high confidence value with the set of non-fraud transaction data is further discarded, thereby reducing false positives and enhancing customer experience. In an alternate embodiment, a human in the loop may be used, where each simulated customer behavior can be manually reviewed for enhanced rule extraction.

In another embodiment, to adjust learning of ever-changing fraud and default patterns, the processor 204 is configured to retrain the GAN models 228 using a reinforcement learning (RL) model so that the GAN models 228 can simulate customer behaviors according to patterns of future evolving fraud and defaults. In real-time implementation, the processor 204 is configured to update model weights of the GAN models 228 including first and second GAN models to account for any new frauds that occur which are being missed. The processor 204 is configured to calculate a reward function based on a match between simulated customer behaviors with real-time or future fraud or default customer behaviors. If the simulated customer behaviors are not matched with real-time or future fraud or default customer behaviors, the processor is configured to update the model weights of the GAN model based on the reward function. Thus, the network weights are steered in the direction of how future frauds are evolving. For this, when fraud/default behaviors are simulated, reinforcement-based generative modeling weight adjustment is performed on a periodic basis. For example, the reinforcement-based generative modeling weight adjustment may be run once every pre-defined time interval such as 1 week, 2 weeks, a month, or the like.

Further, the present disclosure provides a comprehensive description based on several techniques that can be used with GANs in the fraud detection scenario. In an additional embodiment, a conditional Wasserstein GAN+Gradient Penalty (WGANGP) model may be used for the generation of fraudulent data conditioned separately on class labels for fraud samples obtained from k-means clustering and non-fraud samples from the training set.

In some scenarios, using only GAN models may lead to boundary distortion hence leading to a drop in the performance for the majority class (legitimate transactions). A Triplet Network and Siamese Network separately on top of the GAN model or the conditional WGANGP model to learn more discriminative fraud samples are used. Additionally, a neural network-based Classifier model with the GAN model or the WGANGP model may also be used as it is useful for dealing with the boundary distortion problem. All the models are simple architecture with few parameters and are trained end-to-end for the generation of fraudulent data.

In one embodiment, fraud detection is formulated as a binary classification problem. For each transaction record in the dataset, a feature vector and corresponding class label (fraud or non-fraud) are considered. A pipeline for credit card fraud detection using generative models is described below:

1. Train a GAN model to generate the fraudulent samples from the training dataset.
2. Augment the training set with the synthesized fraud samples.
3. Train a classifier on the original and augmented training set separately and compare the performances.

In an embodiment, a publicly available dataset may be used such as a credit card dataset. The dataset has transactions for two days done in September 2019 by one or more cardholders. There are 284807 transactions in the dataset, out of which 492 are fraudulent transactions, i.e., the frauds account for 0.172% of the total transactions. 31 features represent the transactions, namely 'Amount,' 'Time,' 'Class,' and 28 other numerical features obtained from PCA (V1, V2, . . . V28). Feature 'Time' has time elapsed from the first transaction, and 'Class' has label 1 for fraudulent transactions and 0 otherwise. There are no missing values in the dataset. Further, the log transformed 'Amount' values are utilized to give more normal distribution and normalize the features between 0 and 1. The dataset is divided into a train and test set such that the train set has 70% of the transactions in the dataset i.e., 199364 transactions, and the test set has 30% of the transactions in the dataset i.e., 85443 transactions. 344 and 148 fraud samples account for 0.173% of the total transactions in the training and testing set, respectively.

Further, in an embodiment, an XGBoost classifier is trained based on the transaction samples in the training dataset. The trained XGBoost classifier may be used to detect the fraud samples in the testing set. However, since the dataset is highly imbalanced, the WGANGP model for oversampling the fraud (minority class) samples is utilized. Further, the synthetic fraud samples generated from the WGANGP model are used to augment the original dataset and further train the XGBoost classifier.

In one embodiment, the first GAN model may be merged with a Siamese network model. The Siamese network model may include two neural networks. The generator neural network model may be fed with the payment transaction data including information of past payment transactions of customers, for generating simulated customer fraud behaviors. The discriminator neural network model may be fed with the simulated customer fraud behaviors along with the real customer fraud behaviors for determining a deviation value. Based on the deviation value, the discriminator neural network model may provide a binary output denoting if there is a possible fraud or no for a particular simulated customer fraud behavior.

Additionally, the simulated customer fraud behaviors generated by the generator neural network model are provided to one neural network of the Siamese network model. Another neural network may be fed with either real customer fraud behavior or real customer non-fraud behavior. Siamese network model uses contrastive divergence loss denoted as loss to minimize the distance between positive pairs and maximize the distance between negative pairs. It is used on top of the first GAN model to ensure the distribution learned by the generator neural network model for the fraud samples do not overlap with the non-fraud samples. Both first GAN model and the Siamese network model are trained in an end-to-end fashion.

In another embodiment, the first GAN model may be merged with a triplet network model. The triplet network model may include three neural networks. The generator neural network model is fed with the payment transaction data for generating simulated customer fraud behaviors. The discriminator neural network model may be fed with the simulated customer fraud behaviors along with the real customer fraud behaviors for determining a deviation value. Based on the deviation value, the discriminator neural network model may provide a binary output denoting if there is a possible fraud or no for a particular simulated customer fraud behavior.

Additionally, the simulated customer fraud behaviors generated by the generator neural network model are provided to one neural network of the triplet network model. The other two neural networks may be fed with real customer fraud behavior and real customer non-fraud behavior respectively.

The triplet network model has three neural networks with the shared weights that are configured to map the fraud (real and simulated) and non-fraud samples into a shared space such that the distance between them is preserved using triplet loss function. The loss value generated by triplet loss function is denoted by loss. The objective of the triplet loss function is to minimize the distance between the simulated customer fraud behaviors and real customer fraud behaviors and simultaneously maximize the distance between the simulated customer fraud behaviors and real customer non-fraud behaviors. Hence, it is a max-margin framework.

In another embodiment, the first GAN model may be merged with a classifier model. The generator neural network model is fed with the payment transaction data for generating simulated customer fraud behaviors. The discriminator neural network model may be fed with the simulated customer fraud behaviors along with the real customer fraud behaviors for determining a deviation value. Based on the deviation value, the discriminator neural network model may provide a binary output denoting if there is a possible fraud or no a particular simulated customer fraud behavior.

Additionally, the simulated customer fraud behaviors generated by the generator neural network model are provided to the classifier model. The classifier model is also provided with real customer non-fraud behaviors. The classifier model may be a binary classifier module that is added on top of the GAN model. The simulated customer fraud behaviors from the generator neural network model are passed to the classifier model along with the real customer non-fraud behaviors from the training set. The classifier model then distinguishes between the fraud and non-fraud behaviors. The classifier model may incorporate three fully connected layers with 30, 30, and 2 neurons in each layer, respectively. The classifier model may provide a classification output denoted a class i.e., one of fraud/non-fraud.

Figure 3:
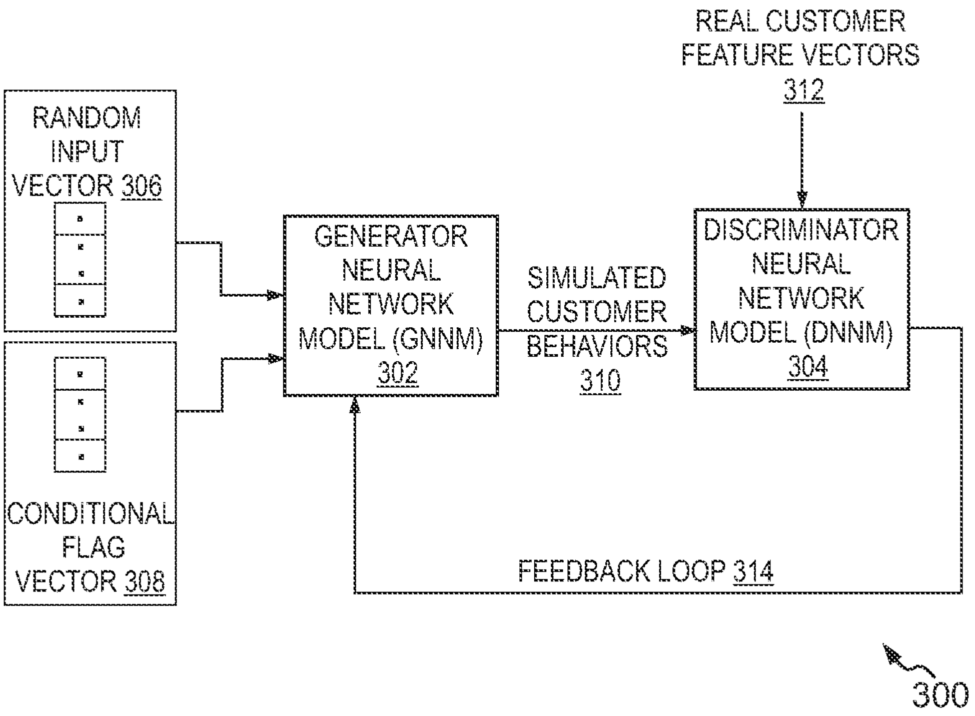
FIG. 3 is a schematic block diagram representation of the training process of generative adversarial network (GAN) model for generating simulated customer behaviors, in accordance with an example embodiment of the present disclosure.

Referring now to FIG. 3, a schematic block diagram representation 300 of the training process of the GAN model for generating simulated customer behaviors, is shown, in accordance with an embodiment of the present disclosure. The simulated customer behaviors may be associated with fraud or default behaviors that are generated by first and second GAN models respectively.

As mentioned previously, the processor 204 is configured to train the GAN models 228 stored in the database 206 for generating simulated customer fraud/default behaviors based on the plurality of customer feature vectors. The GAN model includes two neural networks such as a generator neural network model 302 and a discriminator neural network model 304. The generator neural network model 302 and the discriminator neural network model 304 may be mutually trained so that the generator neural network model 302 is eventually able to generate an output that is similar to the real data and the discriminator neural network model 304 is not able to differentiate between the generated output and the real data.

In one embodiment, the generator neural network model 302 is fed with a random input vector 306 and a conditional flag vector 308. The random input vector 306 is derived from a desired distribution or a vector sampled from the customer transaction features of known customers. During training time, the conditional flag vector 308 is selected randomly to learn the GAN model for all probable credit and fraud risk conditions. The conditional flag vector 308 may be based on conditional parameters such as credit exposure, online and offline fraud transactions, and market-specific frauds, etc. In one embodiment, the generator neural network model 302 is configured to generate n-dimensional customer feature vectors representing simulated customers behaviors 310 based on the random input vector 306 and the conditional flag vector 308. The simulated customer behaviors 310 may be customer behaviors or transactions that are fraud/default in behavior. The discriminator neural network model 304 is then fed with the n-dimensional customer feature vectors associated with simulated customer behaviors 310 and real customer feature vectors 312 (which is provided based on the conditional flag vector 308) to discriminate between simulated virtual customer behaviors and real customer behavior. The real customer feature vectors 312 may be associated with real fraud/default customer transaction data stored in the database 206.

The discriminator neural network model 304 determines a loss by comparing the simulated customer behaviors 310 and the real customer feature vectors 312. In one example, if the loss is greater than a threshold loss value, model weights associated with discriminator are adjusted or penalized. If the loss is less than the threshold loss value, then the discriminator provides the loss to the generator neural network model 302 using a feedback loop 314. The feedback loop 314 may be used to improve the generator neural network model 302 by adjusting the model weights. This process is iteratively performed until the generator neural network model 302 is able to generate the simulated customer behaviors 310 such that the discriminator neural network model 304 is not able to distinguish between the simulated customer behaviors and real customer behavior.

In one embodiment, the generator neural network model 302 and the discriminator neural network model 304 may be trained for a plurality of conditions such as online transactions, offline transactions, high exposure fraudsters, high exposure defaulters, and the like. This facilitates a single GAN model to cater to generate virtual fraud or default customer behaviors for the plurality of conditions.

In one embodiment, the generator neural network model 302 may be trained with only non-fraud transaction data from the customer transaction data 226 to generate the simulated customer behaviors 310. The generator neural network model 302 may learn to generate fraudulent customers based on non-fraudulent transaction data. In an embodiment, in order to increase the number of simulated customer behaviors 310 generated using limited non-fraudulent behavior that is available, the input space is perturbed by increasing the input n-dimensional representation through the addition of latent vector or random noise vector.

Figure 4:
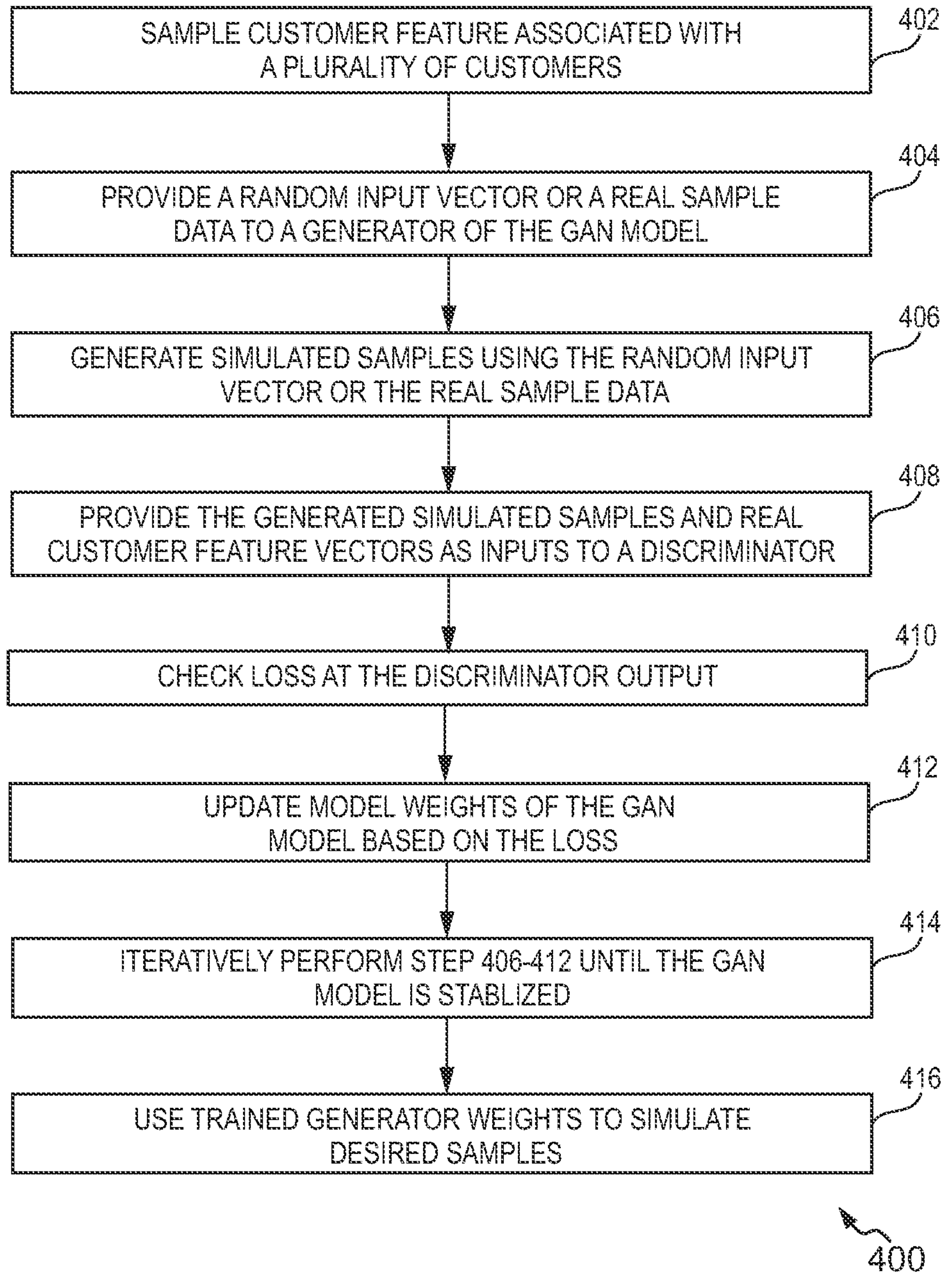
FIG. 4 illustrates a flow diagram of a method for training generative adversarial network (GAN) models for generating unseen or unknown simulated customer behaviors associated with fraud and default behaviors, in accordance with an example embodiment of the present disclosure.

FIG. 4 illustrates a flow diagram of a method 400 for training generative adversarial network (GAN) models for generating unseen or unknown simulated customer behaviors associated with fraud and default behaviors, in accordance with an embodiment of the present disclosure. The method 400 depicted in the flow diagram may be executed by, for example, the at least one server such as the server system 200 explained with reference to FIG. 2, the issuer server 108, and the payment server 102. Operations of the flow diagram of method 400, and combinations of operation in the flow diagram of method 400, may be implemented by, for example, hardware, firmware, a processor, circuitry, and/or a different device associated with the execution of software that includes one or more computer program instructions. It is noted that the operations of the method 400 can be described and/or practiced by using a system other than these server systems. The method 400 starts at operation 402.

As mentioned previously, the GAN model includes a generator neural network model and a discriminator neural network model. In one embodiment, the generator neural network model may be implemented using a multi-layer perceptron (MLP), a convolutional neural network (CNN), and a recurrent neural network (RNN).

At 402, the method 400 includes sampling customer features associated with the plurality of customers 112 which may be related to the desired distribution to be learnt. The customer features are generated using customer transaction data associated with the plurality of customers 112.

At 404, the method 400 includes providing a random input vector or real sample to a generator neural network model of the GAN model.

At 406, the method 400 includes generating simulated samples in the form of n-dimensional customer feature vectors by the generator. The simulated virtual customer may be associated with fraud risk or credit risk of customers.

At 408, the method 400 includes providing the generated simulated samples and real customer feature vectors as inputs to the discriminator. In one embodiment, the real customer feature vectors may be related to fraud or non-fraud customers. At 410, the method 400 includes checking a loss at the discriminator output.

At 412, the method 400 includes updating model weights of the GAN model based on the loss. In case, the loss is greater than a threshold loss value, model weights of the generator neural network model are adjusted, otherwise, the model weights of the discriminator are adjusted.

At 414, the method 400 includes iteratively performing the steps 406-412 until the generator and the discriminator neural network models are stabilized. At 416, the method 400 includes using the trained generator neural network model weights to simulate desired samples. Finally, when the GAN model is stabilized, the model weights of the generator neural network model will be used to generate simulated customers for desired conditions.

Figure 5A:
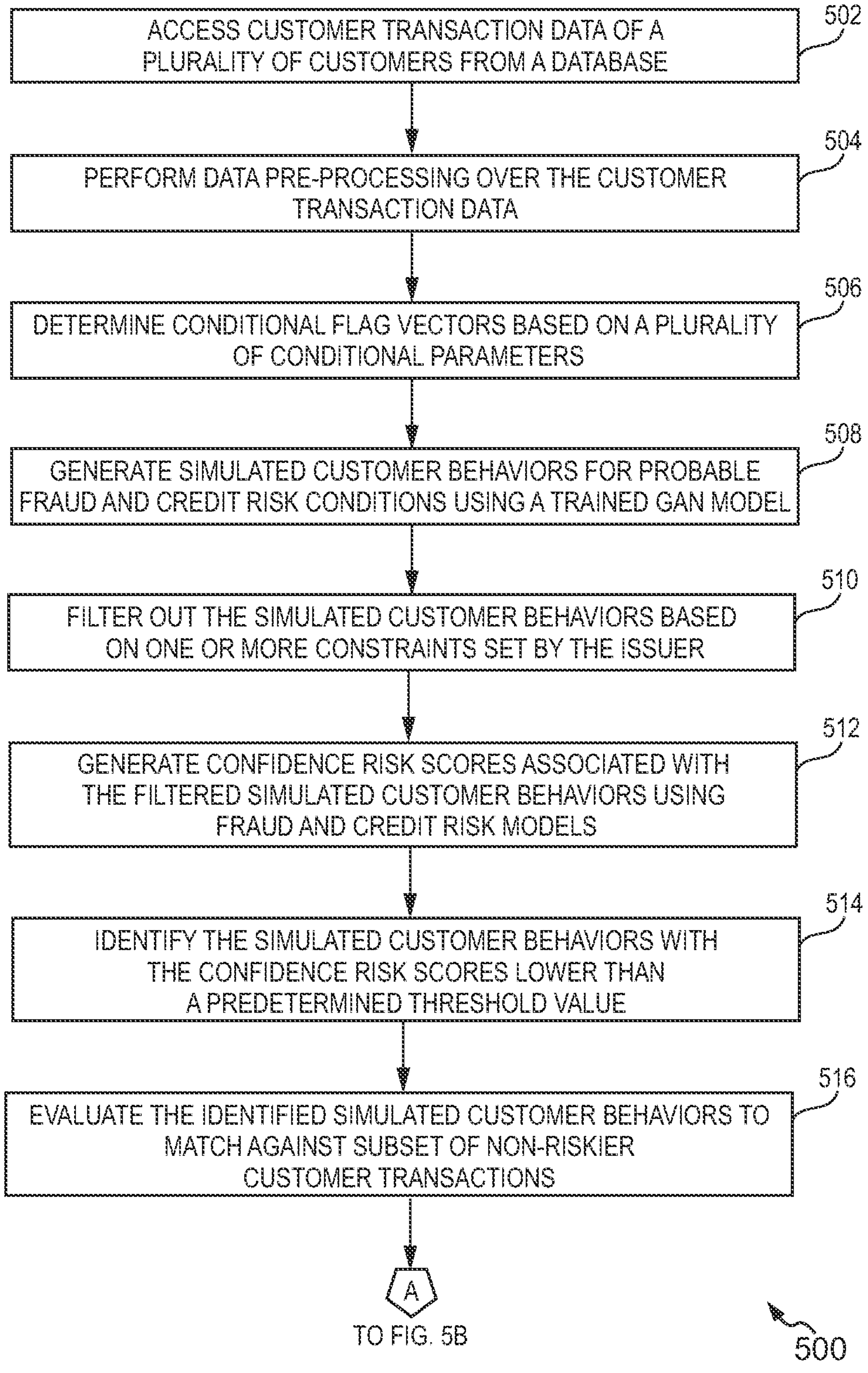
FIGS. 5A and 5B, collectively, represent a flow diagram of a process flow for generating rules for unseen fraud and credit risks at the execution stage, in accordance with an example embodiment of the present disclosure.
Figure 5B:
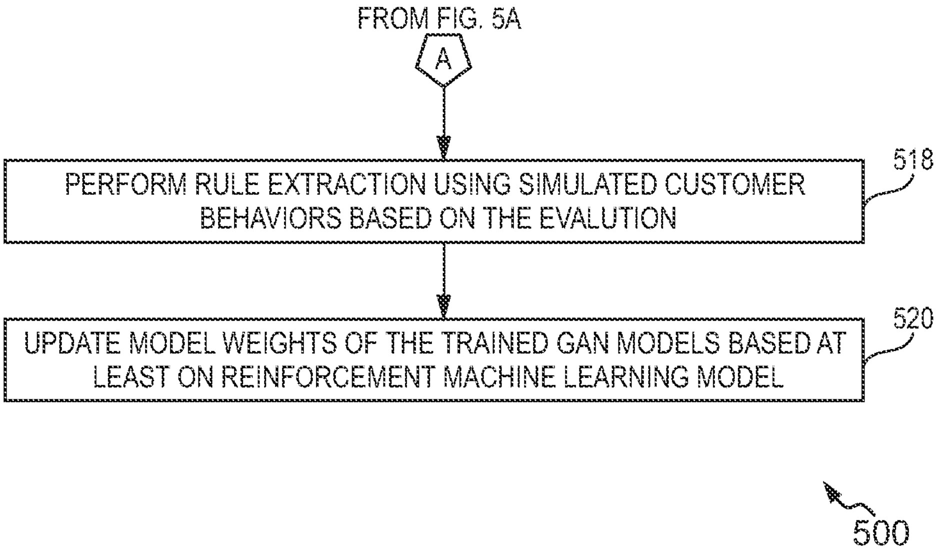

FIGS. 5A and 5B, collectively, represent a flow diagram of a process flow 500 for generating rules for unseen fraud and credit risks at the execution stage, in accordance with one embodiment of the present disclosure. Operations of the process flow 500, and combinations of operation in the process flow 500, may be implemented by, for example, hardware, firmware, a processor, circuitry, and/or a different device associated with the execution of software that includes one or more computer program instructions. The process flow 500 starts at operation 502.

At 502, the processor 204 accesses customer transaction data of the plurality of customers 112 from the database 206. The customer transaction data may be related to fraud, non-fraud, default, non-default customers for a particular time duration (e.g., last 1 year). The customer transaction data may include, but not limited to, customer spending behaviors, payment behavior, and customer credit bureau information, etc.

At 504, the processor 204 is performs data pre-processing over the customer transaction data for determining a plurality of customer feature vectors. In one embodiment, the processor 204 is configured to generate random input vectors using a sample of customer features associated with the plurality of customers 112.

At 506, the processor 204 is determines conditional flag vectors for generating simulated customers based on a plurality of conditional parameters.

At 508, the processor 204 generates simulated customer behaviors for probable fraud and credit risk conditions using the trained GAN model.

At 510, the processor 204 filters out the simulated customer behaviors based on one or more constraints set by the issuer 108 to obtain filtered virtual customers.

At 512, the processor 204 generates confidence risk scores associated with the filtered simulated customer behaviors using fraud and credit risk models.

At 514, the processor 204 identifies the simulated customer behaviors with the fraud/default risk scores lower than a threshold value.

At 516, the processor 204 evaluates the identified simulated customer behaviors to match against a subset of non-riskier customer transactions using a metric based neural network architecture, thereby reducing false positives and enhancing customer experience. In step 516, anyone or more simulated customer fraud and default behaviors the simulated customer fraud and default behaviors having high confidence in matching with the non-riskier customer transactions, those simulated customer behaviors will be discarded for the rule extraction part.

At 518, the processor 204 performs rule extraction using the simulated customer behaviors based on the evaluation for flagging potential fraud or credit threats in the future.

At 520, the processor 204 updates model weights of the trained GAN models based at least on a reinforcement learning (RL) model configured to learn future evolving frauds and defaults on a periodic basis.

Figure 6:
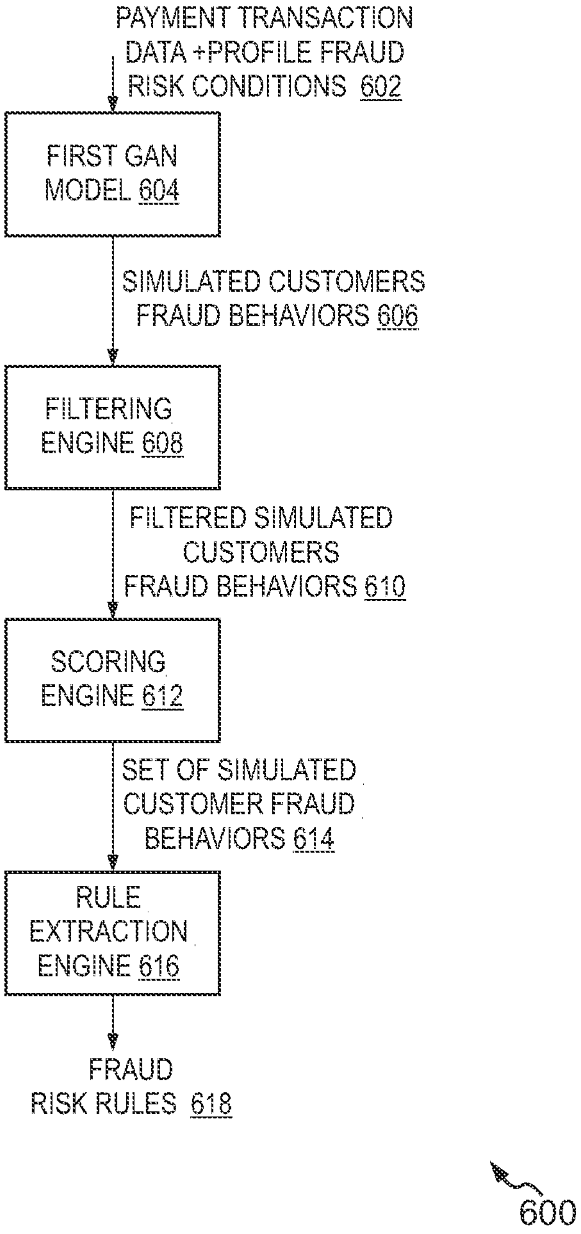
FIG. 6 is a schematic block diagram representation of a first GAN model, in accordance with an example embodiment of the present disclosure.

FIG. 6 is a schematic block diagram representation 600 of a first GAN model 604, in accordance with an example embodiment of the present disclosure. The first GAN model 604 is trained to generate simulated customer fraud behaviors. The first GAN model 604 may be trained based, at least, on the payment transaction data and a plurality of probable fraud risk conditions that may be input to the GAN model as a conditional flag vector. Each bit value of the conditional flag vector represents a combination of the probable fraud risk conditions. The plurality of probable fraud risk conditions may include, but not limited to, high credit exposure fraudsters/defaulters, online versus offline fraud transactions, POS-based transactions, barcode-based transactions, market-specific fraud patterns, etc.

In one embodiment, the payment transaction data associated with a plurality of customers accessed from a transaction database along with a probable fraud risk condition is provided as input (see, 602) to the first GAN model 604. The first GAN model 604 may include a generator neural network model and a discriminator neural network model that are trained iteratively such that the generator neural network model is configured to generated simulated customer fraud behaviors (see, 606).

The simulated customer fraud behaviors may be filtered using the filtering engine 608. The filtering engine 608 may be configured to filter the simulated customer fraud behaviors based at least on constraints set by an issuer such as the issuer 108. The constraints may include, but not limited to, a location, a product, time and amount of transaction, type of transaction, etc. In one example, the issuer 108 may want to detect customers with more cross border transactions. In this scenario, the filtering engine 608 is configured to filter out simulated customer fraud behaviors on the basis of their simulated cross border transaction value. The filtering engine 608 may output filtered simulated customer fraud behaviors (see, 610).

In one embodiment, the filtered simulated customer fraud behaviors are provided to scoring engine 612 as input for generating confidence risk scores for the filtered simulated customer behaviors using credit and fraud risk models. In one embodiment, the credit and fraud risk models 230 may be pre-trained models and generate confidence risk score. In one example, if the confidence risk score for a simulated customer behavior is high, it means that there are high chances of being a fraud in the future. The credit and fraud risk models 230 may output fraud risk scores associated with the filtered simulated customer fraud behaviors that are input to the scoring engine 612.

In one embodiment, a set of simulated customer fraud behaviors from the simulated customer fraud behaviors having a fraud risk score lower than a threshold value is retained and provided to the rule extraction engine 616 (see, 614). This process filters out the simulated customer fraud behaviors that the scoring engine 612 will fail to capture as the fraud risk scores would be low for their chances of being a fraud. The rule extraction engine 616 is configured to extract fraud risk rules (see, 618) which may be used to flag fraudulent customers in real-time using the fraud detection rules associated with the retained simulated customer fraud behaviors. In one embodiment, the fraud risk rules may be extracted manually or automatically by learning a tree classifier resulting in rules to be extracted to classify an incoming real-time transaction as fraudulent. The rule extraction engine 616 may be coupled with other models to extract fraud risk rules indicating a future transaction or a customer to be marked as risky.

Figure 7:
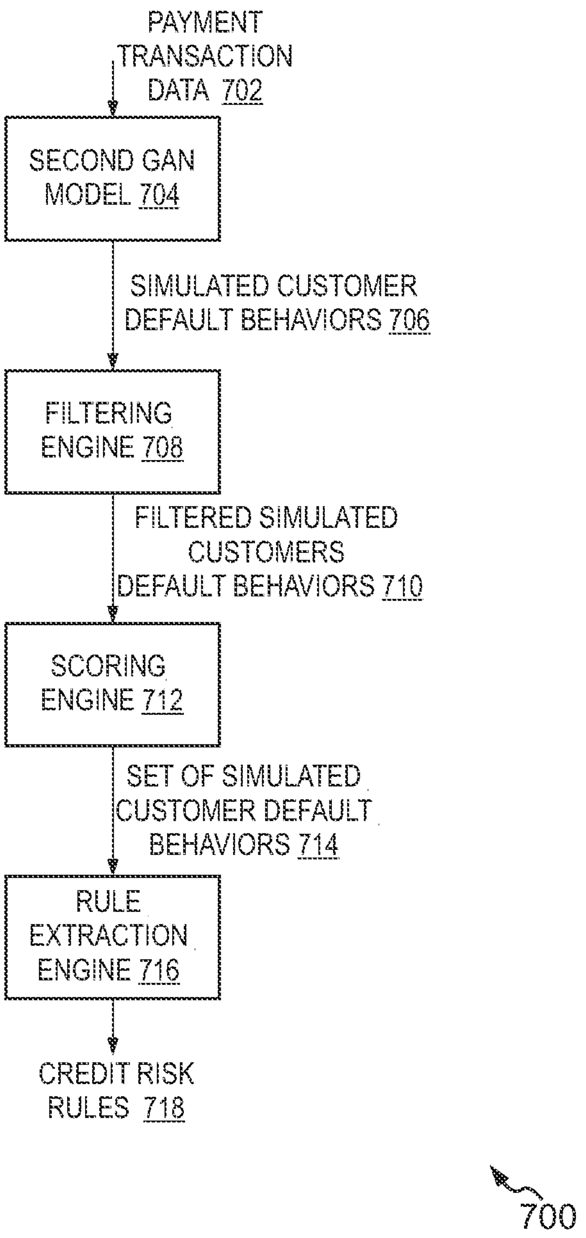
FIG. 7 is a schematic block diagram representation of a second GAN model, in accordance with an example embodiment of the present disclosure.

FIG. 7 is a schematic block diagram representation 700 of a second GAN model 704, in accordance with an example embodiment of the present disclosure. The second GAN model 704 is trained to generate simulated customer default behaviors. The second GAN model 704 may be trained based, at least, on the payment transaction data that are input to the GAN model as random input vectors.

In one embodiment, the payment transaction data associated with a plurality of customers accessed from a transaction database is provided as input (see, 702) to the second GAN model 704. The second GAN model 704 model may include a generator neural network model and a discriminator neural network model that are trained iteratively such that the generator neural network model is configured to generated simulated customer default behaviors (see, 706).

The simulated customer default behaviors may be filtered using the filtering engine 708. The filtering engine 708 may be configured to filter the simulated customer default behaviors based at least on constraints set by an issuer such as the issuer 108. The constraints may include, but not limited to, a location, a product, time and amount of transaction, type of transaction, etc. The filtering engine 708 may output filtered simulated customer default behaviors (see, 710).

In one embodiment, the filtered simulated customer default behaviors are provided to scoring engine 712 as input for generating confidence risk scores for the filtered simulated customer behaviors using credit and fraud risk models. In one embodiment, the credit and fraud risk models 230 may be pre-trained models and generate confidence risk score. In one example, if the confidence risk score for a simulated customer behavior is high, it means that there are high chances of being a default in the future. The credit and fraud risk models 230 may output default risk scores associated with the filtered simulated customer default behaviors that are input to the scoring engine 712.

In one embodiment, a set of simulated customer default behaviors from the simulated customer default behaviors having a default risk score lower than a threshold value is retained and provided to the rule extraction engine 716 (see, 714). This process filters out the simulated customer default behaviors that the scoring engine 712 will fail to capture as the default risk scores would be low for their chances of being a transaction being made by a defaulter. The rule extraction engine 716 is configured to extract credit risk rules (see, 718) which may be used to flag defaulters in real-time using the default detection rules associated with the retained simulated customer default behaviors. In one embodiment, the credit risk rules may be extracted manually or automatically by learning a tree classifier resulting in rules to be extracted to classify an incoming real-time transaction as default/credit risky. The rule extraction engine 716 may be coupled with other models to extract credit risk rules indicating a future transaction or a customer to be marked as risky.

Figure 8A:
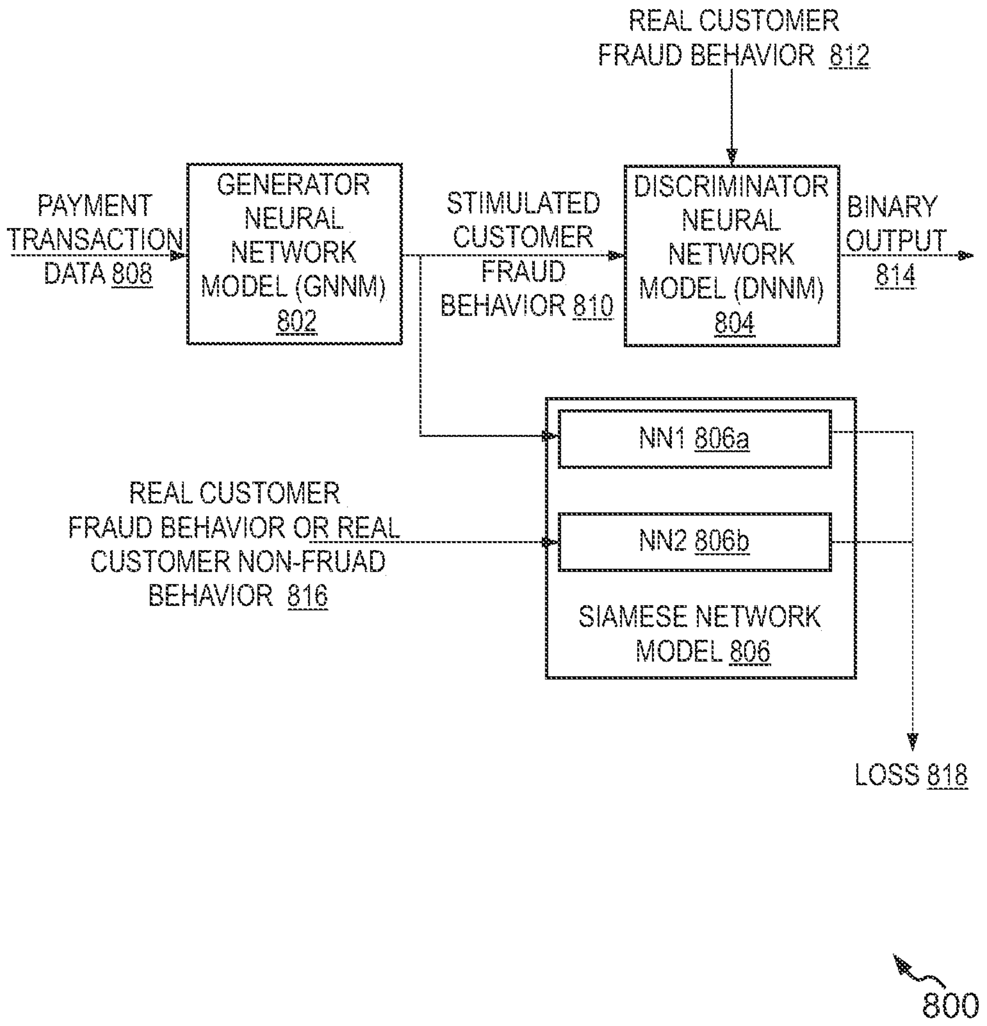
FIGS. 8A-8C are schematic block diagram representations of different configurations of GAN model for data augmentation, in accordance with an example embodiment of the present disclosure.
Figure 8B:
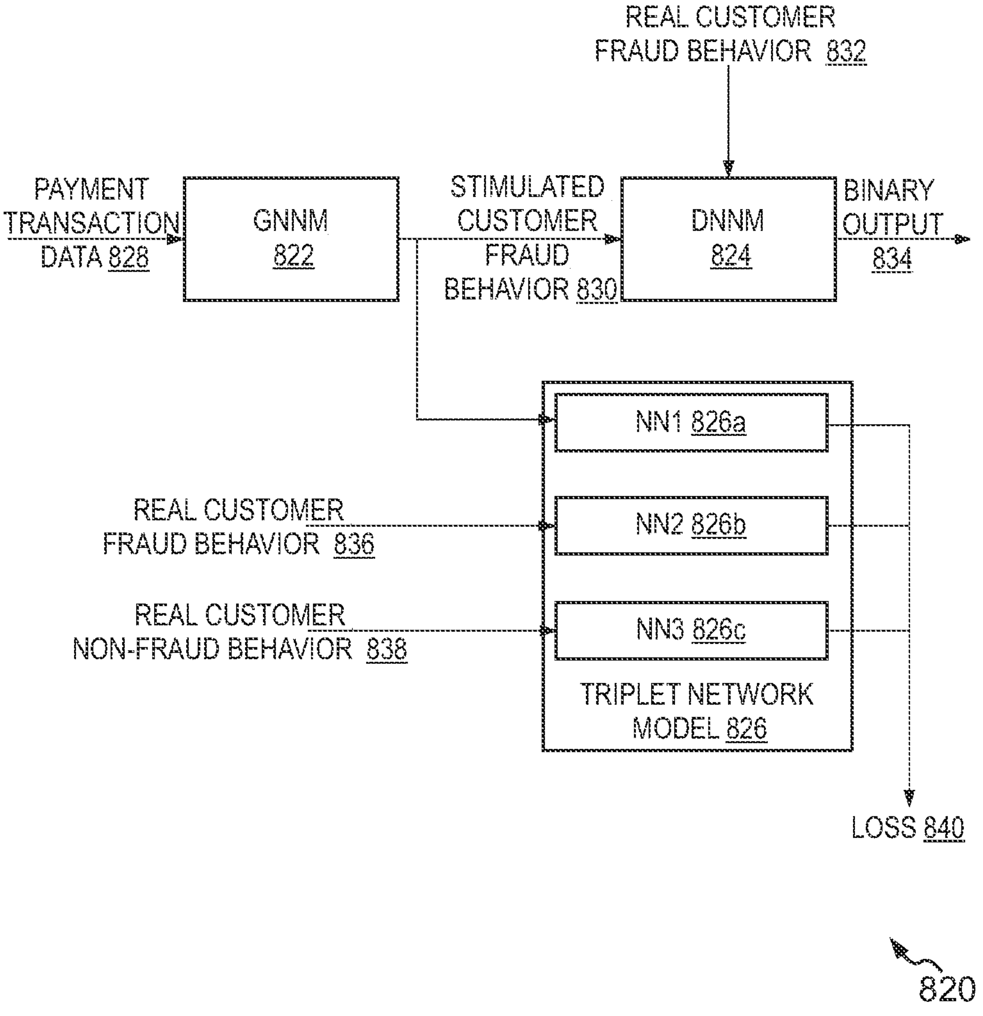
Figure 8C:
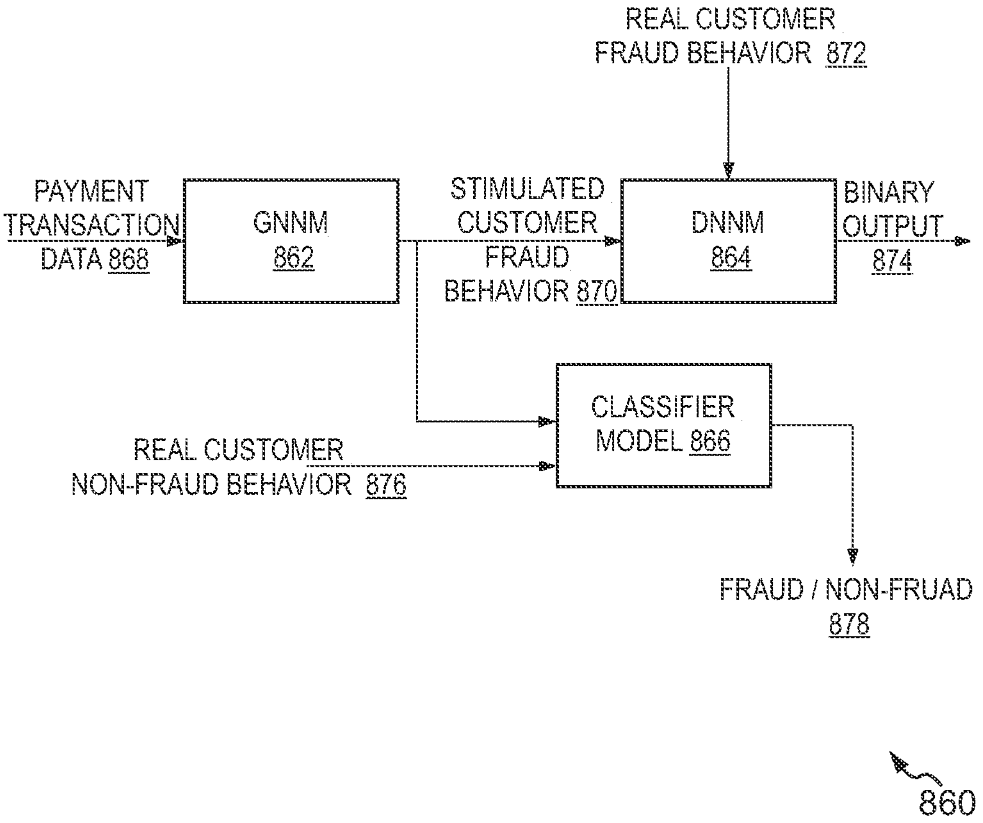

FIGS. 8A-8C are schematic block diagram representations of different configurations of GAN model for data augmentation, in accordance with an example embodiment of the present disclosure. In some embodiments, using only GAN models leads to boundary distortion hence leading to a drop in the performance for the majority class i.e., legitimate transactions. Hence, different configurations of GAN models may be used to overcome such problems. In an embodiment, a triplet network or a Siamese network may be used along with the GAN model to learn more discriminative fraud samples. Another neural network-based Classifier with the GAN model architecture may also be used for dealing with the boundary distortion problem.

FIG. 8A is a schematic block diagram representation 800 of a generator neural network model 802 and a discriminator neural network model 804 of a GAN model merged with a Siamese network model 806. The Siamese network model may include two neural networks i.e., NN1 806*a,* and NN2 806*b*.

As described in earlier stages on the description, the generator neural network model 802 is fed with the payment transaction data (see, 808) for generating simulated customer fraud behaviors (see, 810). The discriminator neural network model 804 may be fed with the simulated customer fraud behaviors along with the real customer fraud behaviors (see, 812) for determining a deviation value. Based on the deviation value, the discriminator neural network model 804 may provide a binary output (see, 814) denoting if there is a possible fraud or no a particular simulated customer fraud behavior.

Additionally, the simulated customer fraud behaviors generated by the generator neural network model 802 are provided to one neural network i.e., NN1 806*a* of the Siamese network model 806. Another neural network i.e., NN2 806*b* may be fed with either real customer fraud behavior or real customer non-fraud behavior (see, 816). Siamese network model 806 uses contrastive divergence loss denoted as loss 818 to minimize the distance between positive pairs and maximize the distance between negative pairs. It is used on top of the underlying GAN model to ensure the distribution learned by the generator neural network model 802 for the fraud samples does not overlap with the non-fraud samples. Both GAN model and the Siamese network model 806 are trained in an end-to-end fashion.

Siamese Network has two neural networks NN1 and NN2 with shared weights and are configured to map the fraud (real and simulated) and non-fraud samples into a shared space such that the distance between them is preserved. The pairs of generated, and real fraud samples as positive pairs i.e., (x^f, xf, 1=1) and generated fraud samples and real non-fraud samples as negative pairs i.e., (x^f, xnf, 1=0) are passed to the Siamese network model 806. The generator neural network model and the Siamese network model are trained based on a contrastive divergence loss function that is utilized to calculate the loss 818.

FIG. 8B is a schematic block diagram representation 820 of a generator neural network model 822 and a discriminator neural network model 824 of a GAN model merged with a triplet network model 826. The triplet network model 826 may include three neural networks i.e., NN1 826*a*, NN2 826*b* and NN3 826*c*.

As described in earlier stages on the description, the generator neural network model 802 is fed with the payment transaction data (see, 828) for generating simulated customer fraud behaviors (see, 830). The discriminator neural network model 824 may be fed with the simulated customer fraud behaviors along with the real customer fraud behaviors (see, 832) for determining a deviation value. Based on the deviation value, the discriminator neural network model 824 may provide a binary output (see, 834) denoting if there is a possible fraud or no a particular simulated customer fraud behavior.

Additionally, the simulated customer fraud behaviors generated by the generator neural network model 822 are provided to one neural network i.e., NN1 826*a* of the triplet network model 826. The other two neural networks i.e., NN2 826*b* and NN3 826*c* may be fed with real customer fraud behavior (see, 836) and real customer non-fraud behavior (see, 838) respectively.

The triplet network model 826 has three neural networks NN1, NN2, and NN3 with the shared weights that are configured to map the fraud (real and simulated) and non-fraud samples into a shared space such that the distance between them is preserved using triplet loss function. The loss value generated by triplet loss function is denoted by loss 840. The objective of the triplet loss function is to minimize the distance between the simulated customer fraud behaviors and real customer fraud behaviors and simultaneously maximize the distance between the simulated customer fraud behaviors and real customer non-fraud behaviors. Hence, it is a max-margin framework.

The triplet including simulated customer fraud behaviors, real customer fraud behaviors, and real customer non-fraud behaviors denoted by (x^f, x+f, x–nf) are passed to the triplet network model 826. The generator neural network model 822 and triplet network model 826 are trained based on the loss 840 generated using the triplet loss function.

FIG. 8C is a schematic block diagram representation 860 of a generator neural network model 862 and a discriminator neural network model 864 of a GAN model merged with a classifier model 866.

As described in earlier stages on the description, the generator neural network model 862 is fed with the payment transaction data (see, 868) for generating simulated customer fraud behaviors (see, 870). The discriminator neural network model 864 may be fed with the simulated customer fraud behaviors along with the real customer fraud behaviors (see, 872) for determining a deviation value. Based on the deviation value, the discriminator neural network model 864 may provide a binary output (see, 874) denoting if there is a possible fraud or no a particular simulated customer fraud behavior.

Additionally, the simulated customer fraud behaviors generated by the generator neural network model 862 are provided to the classifier model 866. The classifier model 866 is also provided with real customer non-fraud behaviors (see, 876).

The classifier model 866 may be a binary classifier module that is added on top of the GAN model. The simulated customer fraud behaviors from the generator neural network model 862 are passed to the classifier model 866 along with the real customer non-fraud behaviors from the training set. The classifier model 866 then distinguishes between the fraud and non-fraud behaviors. The classifier model 866 may incorporate three fully connected layers with 30, 30, and 2 neurons in each layer, respectively. The classifier model 866 may provide a classification output denoted a class i.e., one of fraud/non-fraud (see, 878).

Figure 9:
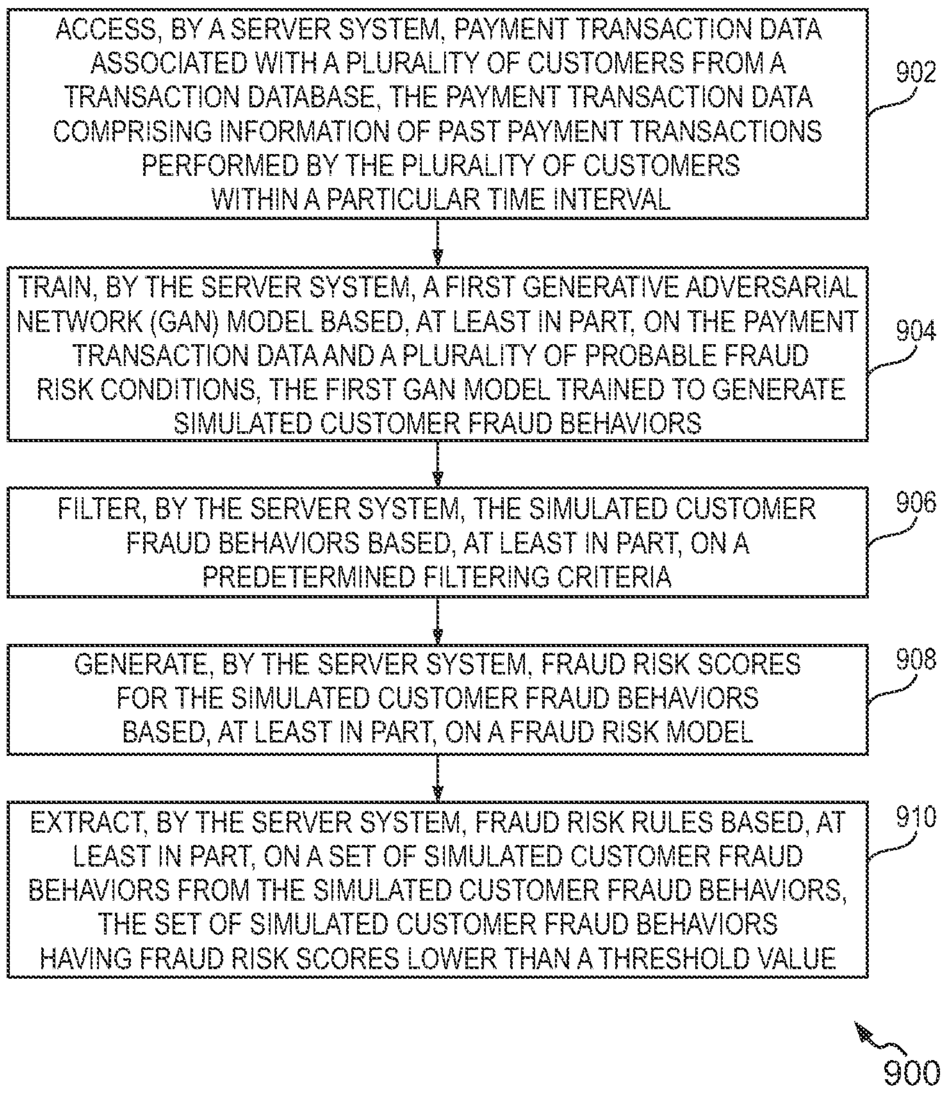
FIG. 9 is a flow diagram of a computer-implemented method for generating fraud risk detection rules for unseen fraud risks using the first GAN model, in accordance with an embodiment of the present disclosure.

FIG. 9 is a flow diagram of a computer-implemented method 900 for generating fraud or credit risk detection rules for unseen fraud risks using first GAN model, in accordance with an embodiment of the present disclosure. The method 900 depicted in the flow diagram may be executed by the server system 106 which may be a standalone server or a server as a whole incorporated in the payment server 102 or issuer server 108. Operations of the method 900, and combinations of operation in the method 900, may be implemented by, for example, hardware, firmware, a processor, circuitry, and/or a different device associated with the execution of software that includes one or more computer program instructions. The method 900 starts at operation 902.

At 902, the method 900 includes accessing, by a server system 106, payment transaction data associated with a plurality of customers (for e.g., plurality of customers 112 as described in FIG. 1) from a transaction database such as the database 114 as described in FIG. 1. The payment transaction data may include information of past payment transactions performed by the plurality of customers 112 within a particular time interval.

At 904, the method 900 includes training, by the server system 106, a first generative adversarial network (GAN) model (for e.g., First GAN model 604 as described in FIG. 6) based, at least in part, on the payment transaction data and a plurality of probable fraud risk conditions. The first GAN model may be trained to generate simulated customer fraud behaviors.

At 906, the method 900 includes filtering, by the server system 106, the simulated customer fraud behaviors based, at least in part, on a predetermined filtering criterion. The predetermined filtering criterion may include constraints set by the issuer 108. The constraints may include, but not limited to, a location, a product, time and amount of transaction, type of transaction, etc.

At 908, the method 900 includes generating, by the server system 106, fraud risk scores for the simulated customer fraud behaviors based, at least in part, on a fraud risk model such as the fraud/credit risk model 230 as described in FIG. 2. The fraud risk model may be a model deployed by the server system to detect fraud or credit risk by determining fraud risk scores for payment behaviors of customers.

At 910, the method 900 includes extracting, by the server system 106, fraud risk rules based, at least in part, on a set of simulated customer fraud behaviors from the simulated customer fraud behaviors. The set of simulated customer fraud behaviors are the ones that have fraud risk scores lower than a threshold value.

Figure 10:
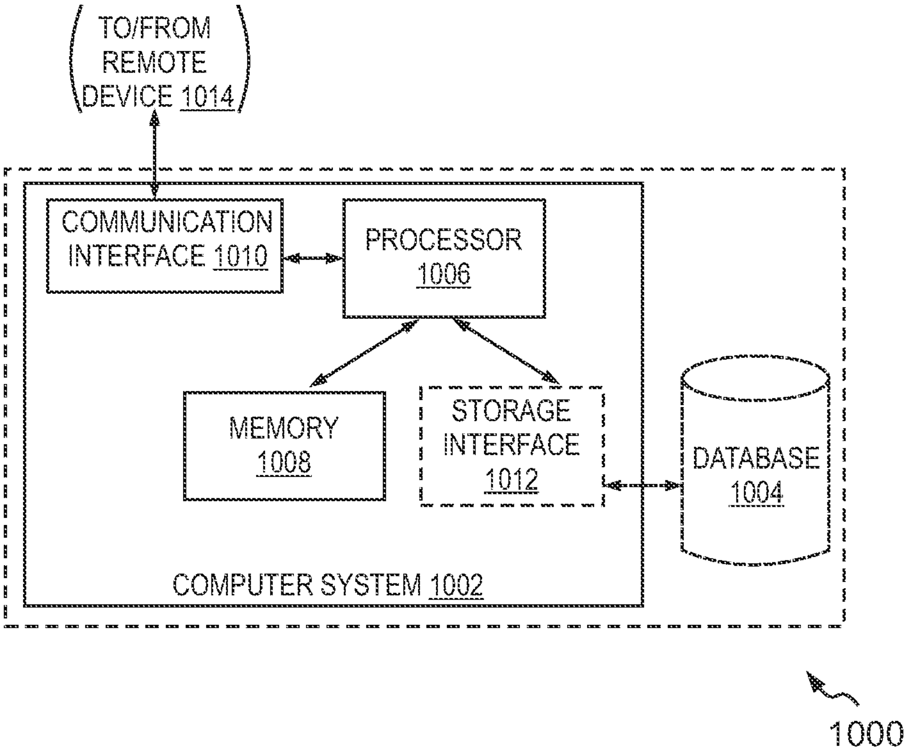
FIG. 10 is a simplified block diagram of a server system for determining unseen fraud or credit abuse, in accordance with an embodiment of the present disclosure.

FIG. 10 is a simplified block diagram of a server system 1000 for determining unseen fraud or credit abuse, in accordance with an embodiment of the present disclosure. The server system 1000 includes a computer system 1002 and a database 1004. In an embodiment, the server system 1000 is integrated, but not limited to, in the server system 106 or in the payment server 102 (referring to FIG. 1).

The computer system 1002 includes at least one processor 1006 configured to execute executable instructions for providing various features of the present disclosure. The executing instructions are stored in a memory 1008. The components of the computer system 1002 provided herein may not be exhaustive and that the computer system 1002 may include more or fewer components than those depicted in FIG. 10. Further, two or more components may be embodied in one single component, and/or one component may be configured using multiple sub-components to achieve the desired functionalities. Some components of the computer system 1002 may be configured using hardware elements, software elements, firmware elements and/or a combination thereof.

The processor 1006 is operatively coupled to a communication interface 1010 such that the computer system 1002 is capable of communicating with a remote device 1014 such as the issuer server 108, or the payment server 102 associated with the payment network 104 or communicated with any entity connected to the network 110 (shown in FIG. 1) or any constituents of the server system 106. In an embodiment, the processor 1006 may be capable of accessing the transaction data associated with the customers from the database 1004. The processor 1006 may further be configured to train GAN models for generating simulated customer behaviors which may be riskier. The processor 1006 may then be able to extract rules based on the simulated customer behaviors after some filtration process.

In some embodiments, the database 1004 is integrated within computer system 1002. For example, the computer system 1002 may include one or more hard disk drives as the database 1004. The storage interface 1012 is any component capable of providing the processor 1006 with access to the database 1004. The storage interface 1012 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1006 with access to the database 1004.

The disclosed method with reference to FIGS. 4, and 5A and 5B, FIG. 9 or one or more operations of the server system 200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method comprising:

accessing, by a server system, payment transaction data associated with a plurality of customers from a transaction database, the payment transaction data comprising information of past payment transactions performed by the plurality of customers within a particular time interval;

training, by the server system, a first generative adversarial network (GAN) model based, at least in part, on the payment transaction data and a plurality of probable fraud risk conditions, the first GAN model trained to generate simulated customer fraud behaviors, the simulated customer fraud behaviors representing fraudulent customer behaviors associated with respective simulated virtual customers;

generating simulated customer fraud behaviors using the trained first GAN model;

filtering, by the server system, the simulated customer fraud behaviors based, at least in part, on a predetermined filtering criterion;

based on the filtering, outputting filtered simulated customer fraud behaviors;

generating, by the server system, fraud risk scores for the filtered simulated customer fraud behaviors using a pre-trained fraud risk model;

retaining, by the server system, a set of simulated customer fraud behaviors from the filtered simulated customer fraud behaviors, the fraud risk scores of the retained set of simulated customer fraud behaviors being lower than a threshold value; and extracting, by the server system, one or more fraud risk rules based, at least in part, on the retained set of simulated customer fraud behaviors, the retained set of simulated customer fraud behaviors representing customer fraud behaviors that are unknown by respective credit and fraud risk models.

2. The computer-implemented method as claimed in claim 1, further comprising:

training, by the server system, a second generative adversarial network (GAN) model based, at least in part, on the payment transaction data, the second GAN model trained to generate multivariate payment transaction sequences associated with simulated customer default behaviors;

filtering, by the server system, the simulated customer default behaviors based, at least in part, on the predetermined filtering criterion;

generating, by the server system, default risk scores for the simulated customer fraud behaviors based, at least in part, on a credit risk model; and extracting, by the server system, credit risk rules based, at least in part, on a set of simulated customer default behaviors from the simulated customer default behaviors, the default risk scores of the set of simulated customer default behaviors being lower than a threshold value.

3. The computer-implemented method as claimed in claim 2, further comprising:

updating, by the server system, the pre-trained fraud and the credit risk models based on the extracted fraud and credit risk rules, respectively.

4. The computer-implemented method as claimed in claim 2, further comprising:

updating, by the server system, the trained first and second GAN models based at least on a reinforcement learning (RL) model to learn future evolving frauds and defaults on a periodic basis.

5. The computer-implemented method as claimed in claim 2, further comprising:

evaluating, by the server system, the retained set of simulated customer fraud behaviors to match against a subset of non-riskier customer transactions based, at least in part, on a metric based neural network architecture; and discarding, by the server system, one or more of the retained set of simulated customer fraud behaviors for rule extraction, the one or more discarded simulated customer fraud behaviors having matching scores greater than the threshold value.

6. The computer-implemented method as claimed in claim 2, wherein training the second generative adversarial network (GAN) model includes the second GAN model learning to model transformation of a customer from non-defaulter state to defaulter state.

7. The computer-implemented method as claimed in claim 1, wherein the first GAN model incorporates a generator neural network model and a discriminator neural network model, and wherein training the first GAN model comprises:

generating a plurality of customer feature vectors based, at least in part, on the payment transaction data, the payment transaction data comprising fraud and non-fraudulent payment transactions;

providing a random input vector to the generator neural network model of the first GAN model based on the plurality of customer feature vectors and a conditional flag vector, the generator neural network model configured to generate univariate customer feature vectors associated with the simulated customer fraud behaviors;

determining, by the discriminator neural network model, a deviation value between the simulated customer fraud behaviors and real customer fraud behaviors; and updating neural network weights of the generator neural network model based, at least in part, on the deviation value.

8. The computer-implemented method as claimed in claim 7, wherein the conditional flag vector is utilized for conditioning input of the generator neural network model based on the plurality of probable fraud risk conditions.

9. The computer-implemented method as claimed in claim 8, wherein the plurality of probable fraud risk conditions comprise one or more of the following: (a) high dollar fraudsters, (b) online versus offline fraud transactions, (c) Point of Sale (POS) versus Barcode based transactions, and (d) market-specific fraud patterns.

10. A server system comprising:

a transaction database; and at least processor programmed to perform operations including:

accessing payment transaction data associated with a plurality of customers from the transaction database, the payment transaction data comprising information of past payment transactions performed by the plurality of customers within a particular time interval;

training a first generative adversarial network (GAN) model based, at least in part, on the payment transaction data and a plurality of probable fraud risk conditions, the first GAN model trained to generate simulated customer fraud behaviors, the simulated customer fraud behaviors representing fraudulent customer behaviors associated with respective simulated virtual customers;

generating simulated customer fraud behaviors using the trained first GAN model;

filtering the simulated customer fraud behaviors based, at least in part, on a predetermined filtering criterion;

based on the filtering, outputting filtered simulated customer fraud behaviors;

generating fraud risk scores for the filtered simulated customer fraud behaviors using a pre-trained fraud risk model;

retaining, by the server system, a set of simulated customer fraud behaviors from the filtered simulated customer fraud behaviors, the retained set of simulated customer fraud behaviors having the fraud risk scores lower than a threshold value; and extracting one or more fraud risk rules based, at least in part, on retained set of simulated customer fraud behaviors, the retained set of simulated customer fraud behaviors representing customer fraud behaviors that are unknown by respective credit and fraud risk models.

11. The server system as claimed in claim 10, said at least one processor being further programmed to perform operations including:

training a second generative adversarial network (GAN) model based, at least in part, on the payment transaction data, the second GAN model trained to generate multivariate payment transaction sequences associated with simulated customer default behaviors;

filtering the simulated customer default behaviors based, at least in part, on the predetermined filtering criterion;

generating default risk scores for the simulated customer fraud behaviors based, at least in part, on a credit risk model; and extracting credit risk rules based, at least in part, on a set of simulated customer default behaviors from the simulated customer default behaviors, the default risk scores of the set of simulated customer default behaviors being lower than a threshold value.

12. The server system as claimed in claim 11, said at least one processor being further programmed to perform operations including:

updating the pre-trained fraud and the credit risk models based on the extracted fraud and credit risk rules, respectively.

13. The server system as claimed in claim 11, said at least one processor being further programmed to perform operations including:

updating the trained first and second GAN models based at least on a reinforcement learning (RL) model to learn future evolving frauds and defaults on a periodic basis.

14. The server system as claimed in claim 11, said at least one processor being further programmed to perform operations including:

evaluating the retained set of simulated customer fraud behaviors to match against a subset of non-riskier customer transactions based, at least in part on a metric based neural network architecture; and discarding one or more of the retained set of simulated customer fraud behaviors for rule extraction, the one or more discarded simulated customer fraud behaviors having matching scores greater than the threshold value.

15. The server system as claimed in claim 11, wherein training the second generative adversarial network (GAN) model includes the second GAN model learning to model transformation of a customer from non-defaulter state to defaulter state.

16. The server system as claimed in claim 10, wherein the first GAN model incorporates a generator neural network model and a discriminator neural network model, and wherein training the first GAN model comprises:

generating a plurality of customer feature vectors based, at least in part, on the payment transaction data, the payment transaction data comprising fraud and non-fraudulent payment transactions;

providing a random input vector to the generator neural network model of the first GAN model based on the plurality of customer feature vectors and a conditional flag vector, the generator neural network model configured to generate univariate customer feature vectors associated with the simulated customer fraud behaviors;

determining, by the discriminator neural network model, a deviation value between the simulated customer fraud behaviors and real customer fraud behaviors; and updating neural network weights of the generator neural network model based, at least in part, on the deviation value.

17. The server system as claimed in claim 16, wherein the conditional flag vector is utilized for conditioning input of the generator neural network model based on the plurality of probable fraud risk conditions.

18. The server system as claimed in claim 17, wherein the plurality of probable fraud risk conditions comprise one or more of the following: (a) high dollar fraudsters, (b) online versus offline fraud transactions, (c) Point of Sale (POS) versus Barcode based transactions, and (d) market-specific fraud patterns.

* * * * *